(12) United States Patent   (10) Patent No.: US 12,679,252 B2
Dabrowski   (45) Date of Patent: Jul. 14, 2026

(54) SEAT TRACK MECHANISM WITH ADJUSTABLE SPACER LENGTH

(71) Applicant: GM GLOBAL TECHNOLOGY OPERATIONS LLC, Detroit, MI (US)

(72) Inventor: Eryk Jerzy Dabrowski, Bloomfield Hills, MI (US)

(73) Assignee: GM GLOBAL TECHONOLGY OPERATIONS LLC, Detroit, MI (US)

( * ) Notice: Subject to any disclaimer, the term of this patent is extended or adjusted under 35 U.S.C. 154(b) by 371 days.

(21) Appl. No.: 18/533,169

(22) Filed: Dec. 7, 2023

(65) Prior Publication Data

US 2025/0187500 A1   Jun. 12, 2025

(51) Int. Cl.
B60N 2/07   (2006.01)

(52) U.S. Cl.
CPC ......... B60N 2/0727 (2013.01); B60N 2/0722 (2013.01)

(58) Field of Classification Search
CPC ....... B60N 2/0727; B60N 2/0722; B60N 2/07
See application file for complete search history.

(56) References Cited

U.S. PATENT DOCUMENTS

| | | | |
|---|---|---|---|
| 2012/0205512 A1* | 8/2012 | Fujishiro | B60N 2/4214 248/429 |
| 2013/0004264 A1* | 1/2013 | Millet | F16B 5/0233 411/535 |
| 2020/0406807 A1* | 12/2020 | Frizzell, III | B60P 1/003 |

FOREIGN PATENT DOCUMENTS

| | | |
|---|---|---|
| DE | 3842661 C1 | 6/1990 |
| DE | 10236068 B4 | 4/2006 |

* cited by examiner

*Primary Examiner* — Daniel J Colilla
(74) *Attorney, Agent, or Firm* — Ingrassia Fisher & Lorenz, LLP | IF&L

(57) ABSTRACT

Vehicles, seat track mechanisms, and methods for manufacturing seat track mechanisms for use with vehicle seats are provided. A method includes determining a track travel length of a vehicle base track and a rail length of a rail of the vehicle seat; determining a spacer length of a spacer for use with the vehicle base track and the rail of the vehicle seat; fixing a first spacer member to a second spacer member to form a spacer having the desired spacer length; and coupling a first sliding member to the first spacer member and couple a second sliding member to the second spacer member to form the seat track mechanism.

20 Claims, 7 Drawing Sheets

532

510

300

531

520

531

532

300

300

SEAT TRACK MECHANISM WITH ADJUSTABLE SPACER LENGTH

The technical field generally relates to vehicle seats, and more particularly relates to seat track mechanisms for providing sliding engagement between the vehicle seats and the vehicle.

Contemporary automobiles offer a range of amenities designed to enhance the comfort of their occupants. Examples of these features include adjustable seats that can be customized to accommodate specific occupants, including adjustments for longitudinal position, seat height, recline angle, lumbar support, and headrest height.

The dimensions of components for adjustable seats may differ based on the internal dimensions of the specific vehicle model, as well as vehicle seat size. Components designed for use in one vehicle model may be not appropriate for use in another vehicle model. Further, adjustments or re-design of certain vehicle features may result in modified dimensions of components for adjustable seats.

Accordingly, it is desirable to provide methods for manufacturing vehicle seat components, such as a seat track mechanism, that provides for adjusting length without requiring new parts or materials. Also, it is desirable to provide seat track mechanisms and vehicles with seat track mechanisms formed with a desired length selected from a range of lengths. Furthermore, other desirable features and characteristics of the present disclosure will become apparent from the subsequent detailed description and the appended claims, taken in conjunction with the accompanying drawings and the foregoing introduction.

SUMMARY

The dimensions of components for adjustable seats may differ based on the internal dimensions of the specific vehicle model, as well as vehicle seat size. Components designed for use in one vehicle model may be not appropriate for use in another vehicle model. Further, adjustments or re-design of certain vehicle features may result in modified dimensions of components for adjustable seats.

Accordingly, it is desirable to provide methods for manufacturing vehicle seat components, such as a seat track mechanism, that provides for adjusting length without requiring new parts or materials. Also, it is desirable to provide seat track mechanisms and vehicles with seat track mechanisms formed with a desired length selected from a range of lengths. Furthermore, other desirable features and characteristics of the present disclosure will become apparent from the subsequent detailed description and the appended claims, taken in conjunction with the accompanying drawings and the foregoing introduction.

In one embodiments, a method for manufacturing a seat track mechanism for use with a vehicle seat includes determining a track travel length of a vehicle base track and a rail length of a rail of the vehicle seat; determining a desired spacer length of a spacer for use with the vehicle base track and the rail of the vehicle seat; fixing a first spacer member to a second spacer member to form a spacer having the desired spacer length; and coupling a first sliding member to the first spacer member and couple a second sliding member to the second spacer member to form the seat track mechanism.

In certain embodiments, the method may further include mounting the seat track mechanism between the vehicle base track and the rail.

In certain embodiments, the method may further include selecting the first spacer member and the second spacer member from a lot of universal spacer members.

In certain embodiments of the method, fixing the first spacer member to the second spacer member to form the spacer having the desired spacer length includes fitting the first spacer member and the second spacer member together without use of a tool.

In certain embodiments of the method, the first spacer member and the second spacer member physically lock to one another when fixed together.

In certain embodiments of the method, the first spacer member and the second spacer member each include alternating projections and recesses.

In certain embodiments of the method, the first spacer member and the second spacer member each include alternating projections and recesses with a constant pitch, and wherein a total length of the spacer may be adjusted by increments of the constant pitch to match the desired spacer length.

In certain embodiments of the method, the first spacer member and the second spacer member each have a same length, and wherein the same length is equal to a minimum length of the spacer.

In another embodiment, a seat track mechanism for sliding in a vehicle base track is provided. The seat track mechanism includes a first sliding member for sliding in the vehicle base track; a second sliding member for sliding in the vehicle base track; a first spacer member having a first end fixed to the first sliding member; and a second spacer member having a second end fixed to the second sliding member. The first spacer member and the second spacer member are configured to mate together at a plurality of configurations to form a spacer having a desired spacer length, the plurality of configurations includes a retracted configuration having a minimum length and an extended configuration having a maximum length.

In certain embodiments of the seat track mechanism, the first spacer member and the second spacer member each include alternating projections and recesses.

In certain embodiments of the seat track mechanism, the first spacer member and the second spacer member each include alternating projections and recesses with a constant pitch, and the desired spacer length may be adjusted by increments of the constant pitch.

In certain embodiments of the seat track mechanism, the first spacer member and the second spacer member physically lock to one another when mated.

In certain embodiments of the seat track mechanism, the first spacer member and the second spacer member each have a same length, and the same length is equal to the minimum length.

In certain embodiments of the seat track mechanism, the first spacer member and the second spacer member are identical.

In certain embodiments of the seat track mechanism, the first sliding member and the second sliding member each include a ball cage containing at least one bearing for riding in the vehicle base track.

In certain embodiments of the seat track mechanism, the seat track mechanism is configured to connect the vehicle base track to a seat rail; and each ball cage includes a lower bearing for rolling against the vehicle base track, an upper bearing for riding against the seat rail, and a bearing spacer configured to separate the lower bearing from the upper bearing.

In another embodiment, a vehicle is provided and includes a vehicle body; a vehicle base track coupled to the vehicle body; a seat rail mounted to a seat and configured for movement with respect to the vehicle base track; and a seat track mechanism including a first sliding member for sliding in the vehicle base track; a second sliding member for sliding in the vehicle base track; a first spacer member having a first end fixed to the first sliding member; and a second spacer member having a second end fixed to the second sliding member. The first spacer member and the second spacer member are configured to mate together at a plurality of configurations to form a spacer member having a desired length, and the plurality of configurations includes a retracted configuration having a minimum length and an extended configuration having a maximum length.

In certain embodiments of the vehicle, the first spacer member and the second spacer member each include alternating projections and recesses with a constant pitch, and the desired length of the spacer member may be adjusted by increments of the constant pitch.

In certain embodiments of the vehicle, the first spacer member and the second spacer member physically lock to one another when mated.

In certain embodiments of the vehicle, the first spacer member and the second spacer member are identical.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses of embodiments herein. Furthermore, there is no intention to be bound by any expressed or implied theory presented in the preceding introduction, brief summary or the following detailed description.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
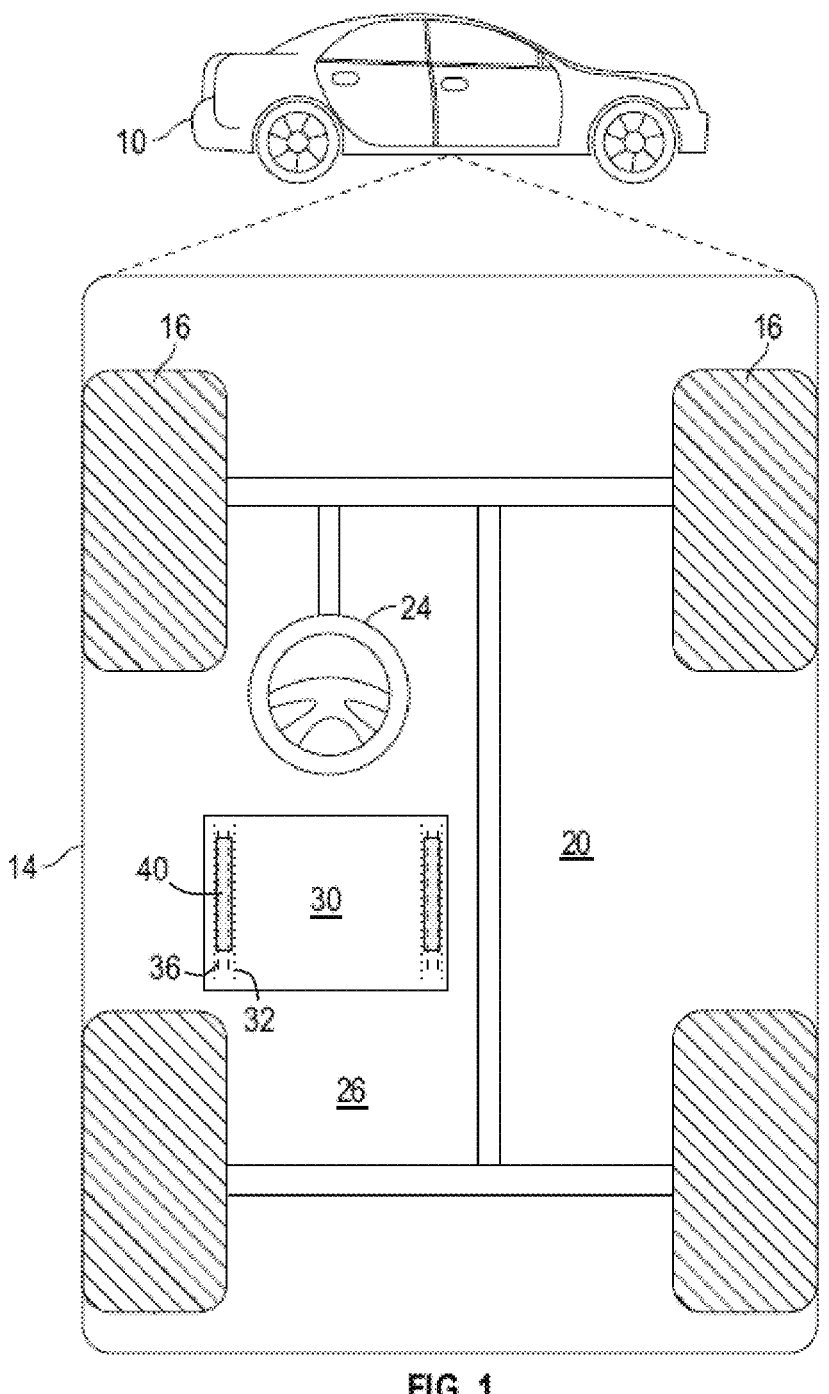
FIG. 1 is functional block diagram of a vehicle including a seat with a seat track mechanism in accordance with an example.

With reference to FIG. 1, certain features of a vehicle 10 are illustrated in functional block diagram form. In certain examples, the vehicle 10 comprises an automobile. In various examples, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles or mobile platforms in certain examples.

As depicted in FIG. 1, the exemplary vehicle 10 generally includes a body 14 and wheels 16. The body 14 substantially encloses components of the vehicle 10. The body 14 may define an internal cabin 20 having a cabin floor 26. The wheels 16 are each rotationally coupled to the vehicle 10 near a respective corner of the body 14.

The vehicle 10 further includes a steering wheel 24 and a vehicle seat 30 distanced from the steering wheel 24 in a longitudinal direction. As indicated, vehicle base tracks 32 may be mounted to the cabin floor 26. Further, seat rails 36 may be coupled to the seat 30 and may cooperate with the vehicle base tracks 32 to provide for sliding engagement between the seat 30 and the cabin floor 26 of the vehicle 10. As shown, a seat track mechanism 40 may be provided between each set of a vehicle base track 32 and a seat rail 36. The vehicle 10 may further include a motor, not shown, for adjusting the position of the seat 30 in the longitudinal direction, i.e., between a front and a rear of the vehicle 10.

Figure 2:
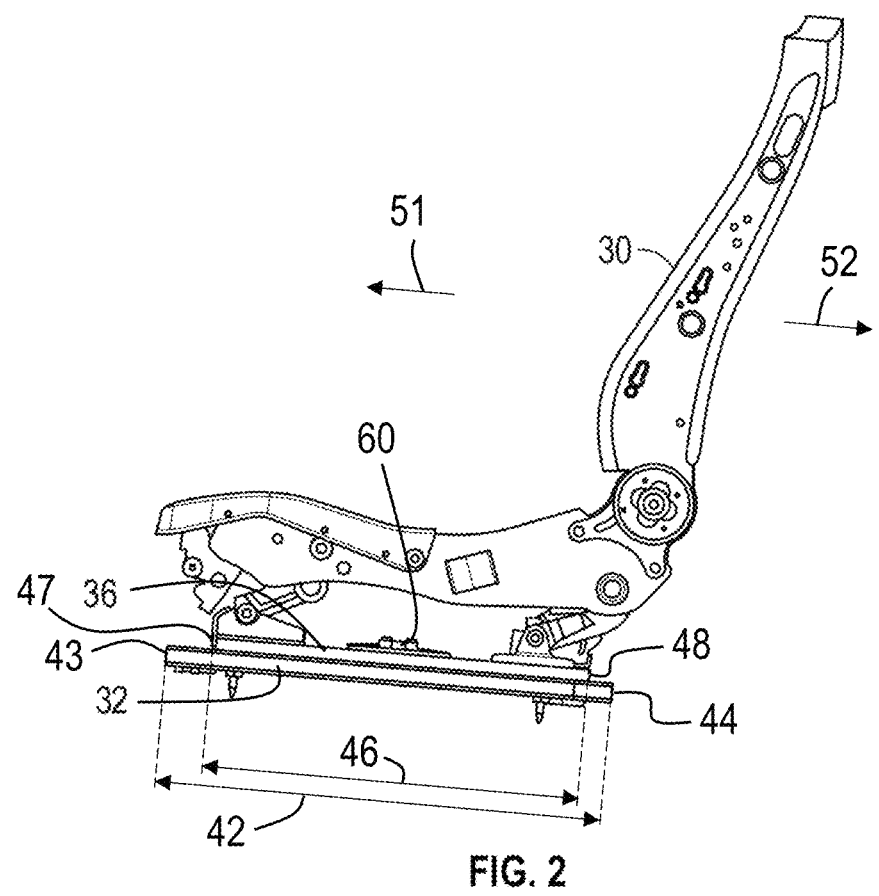
FIG. 2 is a side view of the vehicle seat and seat track mechanism of FIG. 1, in accordance with exemplary embodiments.

FIG. 2 illustrates the engagement and positioning of the seat 30, seat rail 36, and vehicle base track 32.

As shown in FIG. 2, the vehicle base track 32 has a length 42 from a front end 43 to a rear end 44. Further, the seat rail 36 has a length 46 from a front end 47 to a rear end 48. Length 42 is greater than length 46. Therefore, the seat 30 and seat rail 36 may move in a forward direction 51 to the front end 43 or in a rearward direction 52 to the rear end 44. In certain embodiments, movement of the seat 30 and seat rail 36 is limited such that the seat rail 36 stays within the base track 32. Regardless of the structural limitations, a desired amount of track travel of the seat 30 in direction 51 and direction 52 may be determined based on the seat rail 36 and vehicle base track 32.

The seat track mechanism 40 is largely hidden in the view of FIG. 2; however, a portion of a horizontal cross bar 60 for interconnecting the seat track mechanism 40 of the left side of the seat 30 with the seat track mechanism 40 of the right side of the seat 30 is visible above the seat rail 36.

Figure 3:
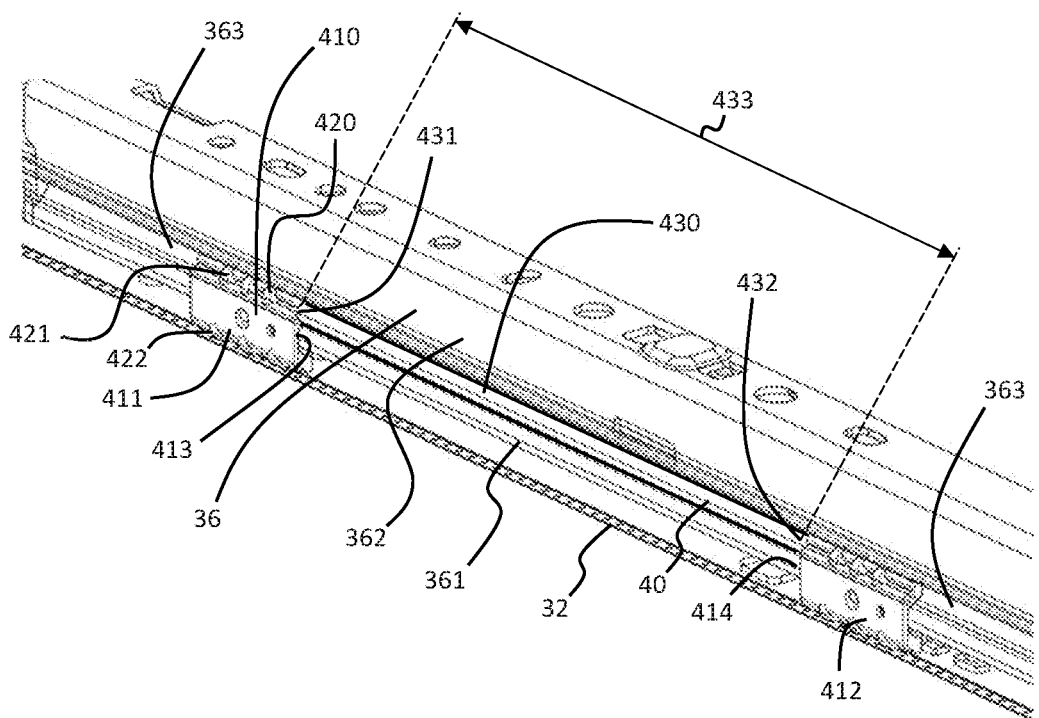
FIG. 3 is a perspective view of the seat track mechanism of FIGS. 1 and 2 in engagement with a vehicle base track and a seat rail, in accordance with exemplary embodiments.

FIG. 3 illustrates a seat track mechanism 40 disposed between a base track 32 and a seat rail 36, such as the base track 32 and seat rail 36 of FIG. 2. In FIG. 3, a laterally outer portion of the base track 32 is removed to allow viewing of the seat track mechanism 40 seated inside the laterally outer portion of the base track 32. Further, only longitudinally central portions of the base track 32 and seat rail 36 are illustrated, i.e., the ends 43, 44, 47 and 48 are not illustrated.

As shown in FIG. 3, the seat track mechanism 40 includes sliding members 410. Specifically, the seat track mechanism 40 includes a front sliding member 411 and a rear sliding member 412. Each sliding member 410 may be a ball cage containing ball bearings 420. For example, each sliding member 410 may include a lower bearing 422 rolling engagement with the vehicle base track 32 and an upper bearing 421 for rolling engagement with the seat rail 36. In other embodiments, each sliding member 410 may have another structure configured for sliding engagement with the vehicle base track 32 and/or seat rail 36.

As shown, the front sliding member 411 has a first internal end 413 and the rear sliding member 412 has a second internal end 414. The first internal end 413 and second internal end 414 face one another.

The seat track mechanism 40 further includes a spacer 430 interconnecting the front sliding member 411 and the rear sliding member 412. Specifically the spacer 430 includes a front end 431 fixed to the first internal end 413 of the front sliding member 411 and a rear end 432 fixed to the second internal end 414 of the rear sliding member 412. The spacer 430, upper bearings 421, and upper portions of the front sliding member 411 and the rear sliding member 412 may be received within a channel 363 formed in the seat rail 36. For example, the seat rail 36 may include a lower lip portion 361 located below the spacer 430 and may include an upper portion 362, as shown.

The spacer 430 has a spacer length 433 from the front end 431 to the rear end 432. As described below, the spacer 430 may be formed such that the spacer length 433 is a desired length. Specifically, it may be determined during design or re-design processes that the sliding members 410 should be distanced from one another by a desired spacer length. After the desired spacer length is identified, the spacer 430 is formed with the desired spacer length from existing components without re-tooling or forming parts dedicated for a spacer having the desired spacer length.

FIGS. 4-9 illustrate the formation of a spacer 430 having the desired spacer length from spacer members 500, such as a first spacer member 510 and a second spacer member 520.

Figure 4:
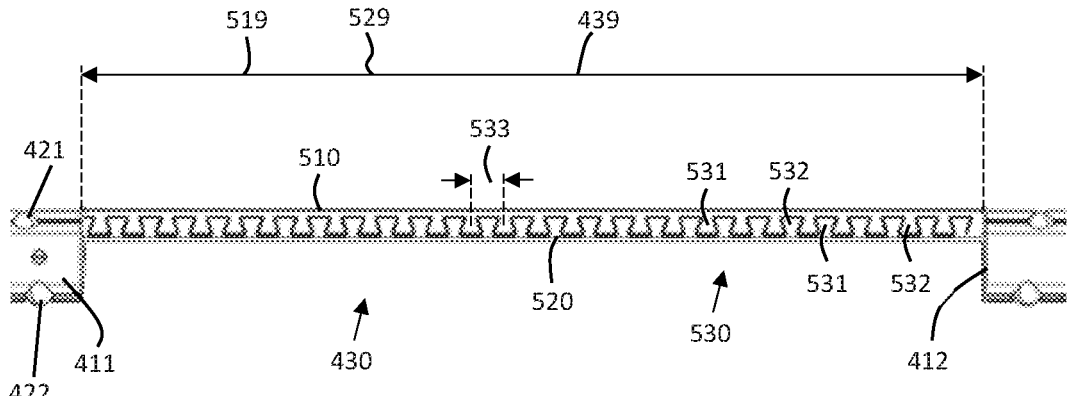
FIG. 4 is a side view of the adjustable seat track mechanism of FIGS. 1-3, formed from a first spacer member and a second spacer member, in accordance with exemplary embodiments.
Figure 5:
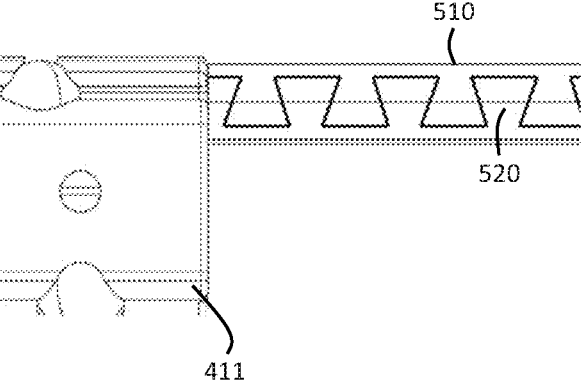
FIG. 5 is a side view focused on one end of the adjustable seat track mechanism of FIG. 4, in accordance with exemplary embodiments.
Figure 6:
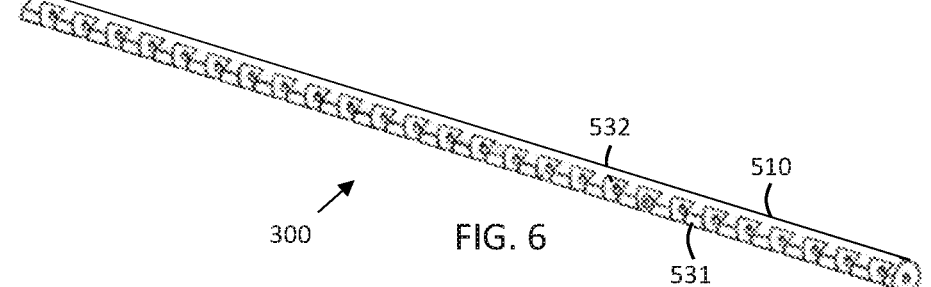
FIG. 6 is a perspective view of the first spacer member of FIGS. 4 and 5, in accordance with exemplary embodiments.
Figure 7:
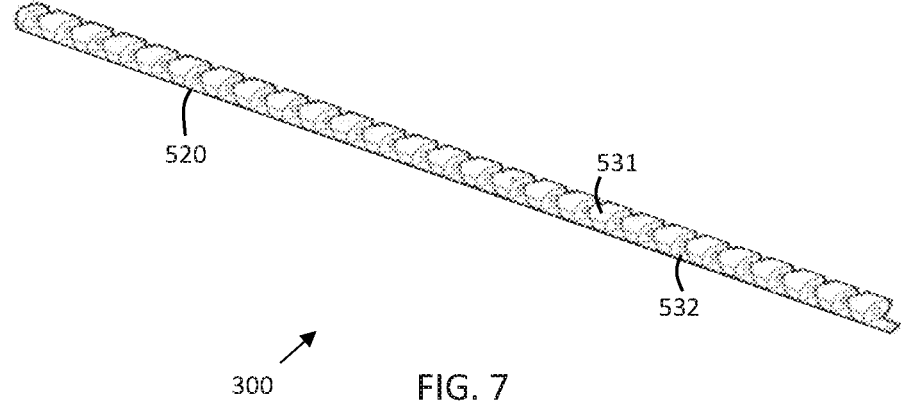
FIG. 7 is a perspective view of the second spacer member of FIGS. 4 and 5, in accordance with exemplary embodiments.

In FIG. 4, a first spacer member 510 is fixed to a second spacer member 520 to form a spacer 430 that interconnects sliding members 411 and 412. FIG. 5 provides a focused view of the interconnection of the first spacer member 510 and the spacer member 510. FIG. 6 is a perspective view of the first spacer member 510 of FIGS. 4 and 5. FIG. 7 is a perspective view of the second spacer member 520 of FIGS. 4 and 5.

In the embodiments of FIGS. 4-7, the first spacer member 510 and second spacer member 520 are identical, i.e., have the same size (length and diameter), shape, and material. In other embodiments, the first spacer member 510 and second spacer member 520 may not be identical.

As shown, each of the spacer members 510 and 520 are formed with connective structures 530. Specifically, in the illustrated embodiment, the connective structures 530 comprise a pattern of mating projections 531 and recesses 532. In the illustrated embodiment, the projections 531 and recesses 532 may have a uniform shape and uniform size and are formed at a constant distance or pitch 533. In other embodiments, the projections 531 and recesses 532 may be non-uniform in size and/or shape, or be non-uniformly spaced apart. In still other embodiments, the connective structures 530 may include other locking increments, clips, mating threads, tongue-and-groove structures, steps, or other structures.

The projections 531 of the first spacer member 510 are received in, and mate with, the recesses 532 of the second spacer member 520. Likewise, the projections 531 of the second spacer member 520 are received in, and mate with, the recesses 532 of the first spacer member 510. The respective projections 531 may be press fit or snapped into the respective recesses 532, such that after the projections 531 are inserted into the recesses 532, the projections 531 are retained therein by friction. It is noted that the respective projections 531 may be press fit or snapped into the respective recesses 532 without use of tools. Further, the spacer members 510 and 520 may be adhered together with adhesive, by thermal treatment, by welding, or otherwise permanently fixed together after being press fit together. After being connected together, the first spacer member 510 and second spacer member 520 form the spacer 430.

In FIG. 4, spacer member 510 has a length 519, spacer member 520 has a length 529, and the spacer 430 has a length 439. As shown, length 519, length 529, and length 439 are equal. In the configuration of FIG. 4, the spacer 430 has the minimum length 439 available from fitting the first spacer member 510 and second spacer member 520 together.

Figure 8:
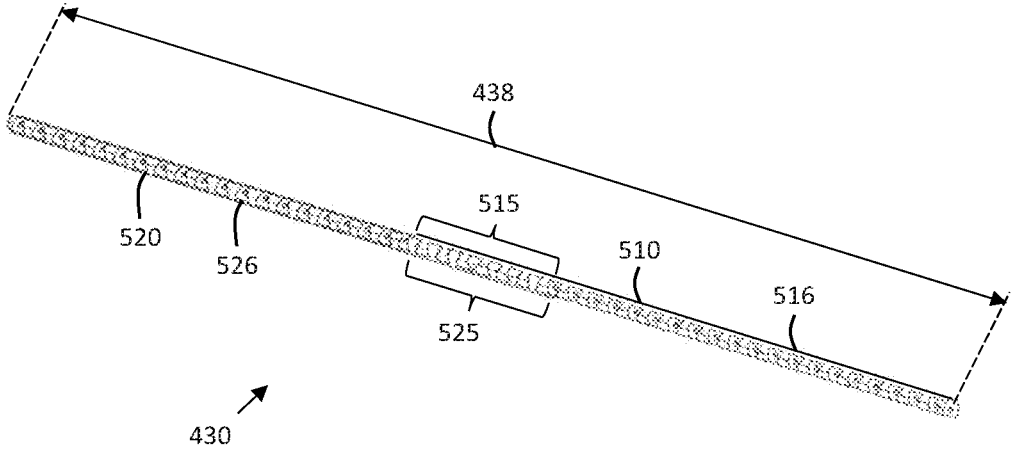
FIG. 8 is a perspective view of a spacer formed from the first spacer member of FIG. 6 and the second spacer member of FIG. 7 with a maximum length.

FIG. 8 illustrates a configuration in which the first spacer member 510 and second spacer member 520 are fit together to form the spacer 430 with a maximum length 438. For example, a portion 515 of the first spacer member 510 and a portion 525 of the second spacer 520 overlap and are fit together such that the lengths of a non-overlapping portion 516 of the first spacer member 510 and a non-overlapping portion 526 of the second spacer member 520 are maximized. The maximum length 438 is equal to the sum of the length of the overlapping portions 515 and 525, the length of the non-overlapping portion 516, and the length of the non-overlapping portion 526. The length of the overlapping portions 515 and 525 may be determined by the necessary structural strength needed by the spacer 430 in use. For example, in certain embodiments, at least 5% of the total length of each spacer member 510 and 520 may overlap to provide sufficient strength, such as at least 10%, at least 15%, at least 20%, at least 25%, at least 30%, or at least 33% of the total length of each spacer member 510 and 520.

Figure 9:
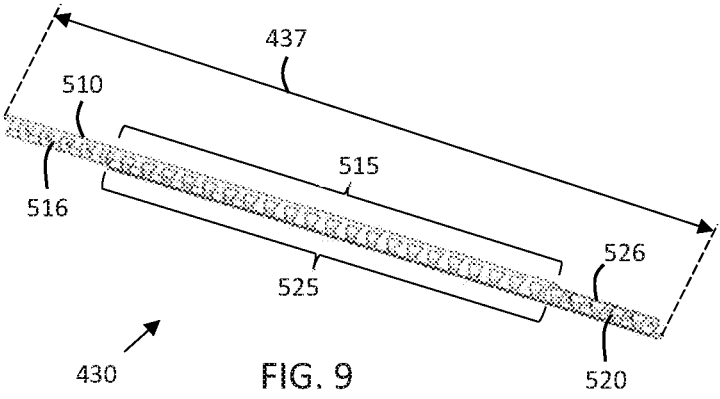
FIG. 9 is a perspective view of a spacer formed from the first spacer member of FIG. 6 and the second spacer member of FIG. 7 with a reduced length.

FIG. 9 illustrates a configuration in which the first spacer member 510 and second spacer member 520 are fit together to form the spacer 430 with a reduced length 437. For example, portion 515 of the first spacer member 510 and portion 525 of the second spacer 520 overlap and are fit together such that the lengths of non-overlapping portion 516 and non-overlapping portion 526 are neither maximized, as in FIG. 8, nor minimized, i.e., zero as in FIG. 4. Again, the reduced length 437 is equal to the sum of the length 517 of the overlapping minimum portions, the length of the non-overlapping portion 516 and the length of the non-overlapping portion 526.

Thus, FIGS. 4, 8 and 9 illustrate three possible configurations of the spacer members 510 and 520 resulting in spacers 430 of three different lengths. As can be seen from the structure of the spacer members 510 and 520, the number of possible lengths of the spacer 430 between the minimum length 439 and the maximum length 438 result from the number of possible increments of interconnection of connective structures 530 on the spacer members 510 and 520. In other embodiments, such as a threaded engagement between spacer members 510 and 520, the adjustment increments are continuous and unnumbered.

Figure 10:
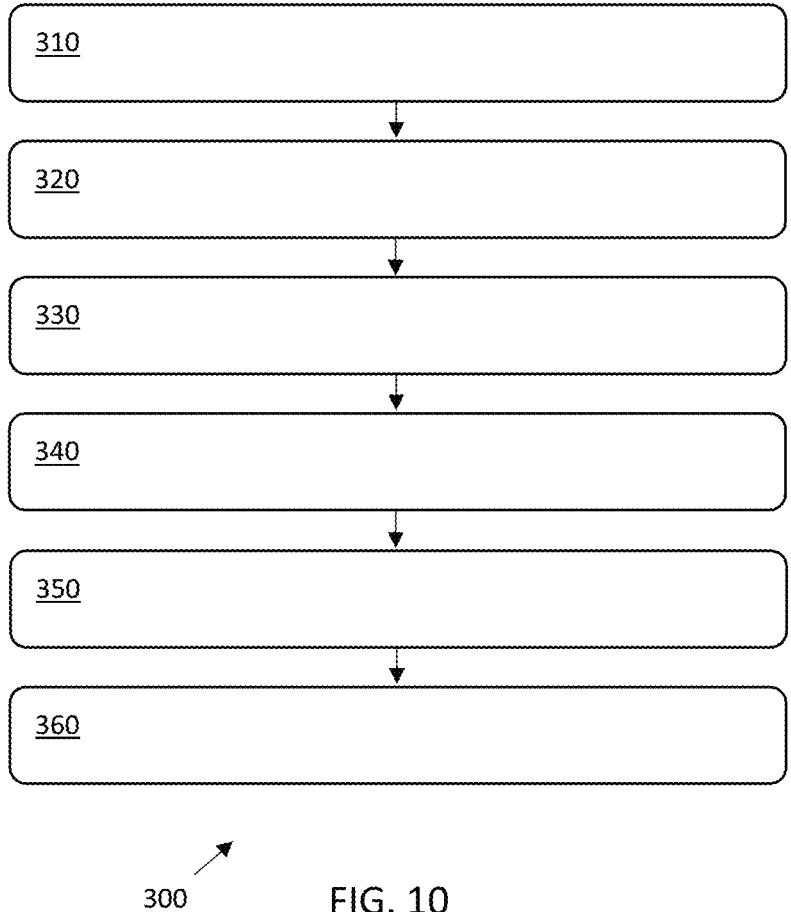
FIG. 10 is a flow chart of a method for manufacturing a seat track mechanism.

Referring now to FIG. 10, a method 300 for manufacturing a seat track mechanism 40 for use with a vehicle seat 30 is provided. The method 300 includes, at operation 310, determining a track travel length of a vehicle base track 32 and a rail length of a rail 36 of the vehicle seat 30.

Method 300 may continue at operation 320 with determining a desired spacer length of a spacer 430 for use with the vehicle base track 32 and the rail 36 of the vehicle seat 30. For example, an optimal spacing of components may be determined for the specified track travel length and the sliding member structural configuration based on rail length.

For example, if track travel is increased, for example by 20 mm, the spacing of internal components (i.e., the spacer length) may be decreased by 10 mm (common practice is 50% of travel increase/decrease represents spacing adjustment). Sliding member length would only change if the rail length changes (1:1 change in set increments for commonality). On the other hand, if track travel is decreased, for example by 40 mm, then the spacing of internal components (i.e., the spacer length) may be increased by 20 mm.

Method 300 may include, at operation 330, selecting the first spacer member 510 and the second spacer member 520 from a lot of universal spacer members.

Also, method 300 may continue at operation 340 with fixing a first spacer member 510 to a second spacer member 520 to form a spacer 430 having the desired spacer length. Fixing the first spacer member 510 to the second spacer member 520 may be performed without use of a tool. In certain embodiments, the first spacer member 510 and the second spacer member 520 physically lock to one another when fixed together. For example, the first spacer member 510 and the second spacer member 520 may each include alternating projections and recesses. Further, the alternating projections and recesses may be provided with a constant pitch, such that a total length of the spacer may be adjusted by increments of the constant pitch to match the desired spacer length.

Method 300 may include, at operation 350, coupling a front sliding member 411 to the first spacer member 510 and coupling a rear sliding member 412 to the second spacer member 520 to form the seat track mechanism 40.

At operation 360, method 300 may include mounting the seat track mechanism 40 between the vehicle base track 32 and the rail 36.

As described herein, the most optimum spacing or slider length is used when the configuration changes due to architecture needs with ease due to the adjustability of the components without the use of additional or unique parts.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for manufacturing a seat track mechanism for use with a vehicle seat, the method comprising:

determining a track travel length of a vehicle base track and a rail length of a rail of the vehicle seat;

determining a desired spacer length of a spacer for use with the vehicle base track and the rail of the vehicle seat;

fixing a first spacer member to a second spacer member to form a spacer having the desired spacer length, wherein the first spacer member and the second spacer member each include alternating projections and recesses; and coupling a first sliding member to the first spacer member and coupling a second sliding member to the second spacer member to form the seat track mechanism.

2. The method of claim 1, further comprising mounting the seat track mechanism between the vehicle base track and the rail.

3. The method of claim 1, further comprising selecting the first spacer member and the second spacer member from a lot of universal spacer members.

4. The method of claim 1, wherein fixing the first spacer member to the second spacer member to form the spacer having the desired spacer length comprises fitting the first spacer member and the second spacer member together without use of a tool.

5. The method of claim 1, wherein the first spacer member and the second spacer member physically lock to one another when fixed together.

6. The method of claim 1, wherein, when fixing the first spacer member to the second spacer member, the projections of the first spacer member are received in the recesses of the second spacer member and the projections of the second spacer member are received in the recesses of the first spacer member.

7. The method of claim 1, wherein the alternating projections and recesses have a constant pitch, and wherein a total length of the spacer may be adjusted by increments of the constant pitch to match the desired spacer length.

8. The method of claim 1, wherein the first spacer member and the second spacer member each have a same length, and wherein the same length is equal to a minimum length of the spacer.

9. A seat track mechanism for sliding in a vehicle base track, the seat track mechanism comprising:

a first sliding member for sliding in the vehicle base track;

a second sliding member for sliding in the vehicle base track;

a first spacer member having a first end fixed to the first sliding member, the first spacer member including alternating projections and recesses; and a second spacer member having a second end fixed to the second sliding member, the second spacer member including alternating projections and recesses;

wherein the first spacer member and the second spacer member are configured to mate together at a plurality of configurations to form a spacer having a desired spacer length, wherein the plurality of configurations includes a retracted configuration having a minimum length and an extended configuration having a maximum length.

10. The seat track mechanism of claim 9, wherein the projections of the first spacer member are received in the recesses of the second spacer member and the projections of the second spacer member are received in the recesses of the first spacer member.

11. The seat track mechanism of claim 9, wherein the alternating projections and recesses have a constant pitch, and wherein the desired spacer length may be adjusted by increments of the constant pitch.

12. The seat track mechanism of claim 9, wherein the first spacer member and the second spacer member physically lock to one another when mated.

13. The seat track mechanism of claim 9, wherein the first spacer member and the second spacer member each have a same length, and wherein the same length is equal to the minimum length.

14. The seat track mechanism of claim 9, wherein the first spacer member and the second spacer member are identical.

15. The seat track mechanism of claim 9, wherein the first sliding member and the second sliding member each comprise a ball cage containing at least one bearing for riding in the vehicle base track.

16. The seat track mechanism of claim 15, wherein:

the seat track mechanism is configured to connect the vehicle base track to a seat rail; and each ball cage includes a lower bearing for rolling against the vehicle base track, an upper bearing for riding against the seat rail, and a spacer portion of the ball cage disposed between the lower bearing and the upper bearing and configured to separate the lower bearing from the upper bearing.

17. A vehicle comprising:

a vehicle body;

a vehicle base track coupled to the vehicle body;

a seat rail mounted to a seat and configured for movement with respect to the vehicle base track; and a seat track mechanism comprising:

a first sliding member for sliding in the vehicle base track;

a second sliding member for sliding in the vehicle base track;

a first spacer member having a first end fixed to the first sliding member; and a second spacer member having a second end fixed to the second sliding member;

wherein the first spacer member and the second spacer member each include alternating projections and recesses, wherein the first spacer member and the second spacer member are configured to mate together at a plurality of configurations to form a spacer member having a desired length, wherein the plurality of configurations includes a retracted configuration having a minimum length and an extended configuration having a maximum length.

18. The vehicle of claim 17, wherein the first sliding member and the second sliding member each comprise a ball cage containing at least one bearing for riding in the vehicle base track, wherein each ball cage includes a lower bearing for rolling against the vehicle base track, an upper bearing for riding against the seat rail, and a spacer portion of the ball cage disposed between the lower bearing and the upper bearing and configured to separate the lower bearing from the upper bearing.

19. The vehicle of claim 17, wherein the first spacer member and the second spacer member physically lock to one another when mated.

20. The vehicle of claim 17, wherein the first spacer member and the second spacer member are identical.

* * * * *